(12) United States Patent
Dixit et al.

(10) Patent No.: US 11,106,657 B2
(45) Date of Patent: Aug. 31, 2021

(54) OPTIMIZING HASH STORAGE AND MEMORY DURING CACHING

(71) Applicant: International Business Machines Corporation, Armonk, NY (US)

(72) Inventors: Akshat Dixit, Lucknow (IN); Annwesh Barik, Rourkela (IN)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 16/196,004

(22) Filed: Nov. 20, 2018

(65) Prior Publication Data

US 2020/0159846 A1 May 21, 2020

(51) Int. Cl.
*G06F 16/30* (2019.01)
*G06F 16/23* (2019.01)
*G06F 16/22* (2019.01)

(52) U.S. Cl.
CPC ...... *G06F 16/2379* (2019.01); *G06F 16/2246* (2019.01)

(58) Field of Classification Search
CPC .................. G06F 16/2379; G06F 16/2246
USPC ............................................... 707/736
See application file for complete search history.

(56) References Cited

U.S. PATENT DOCUMENTS

| 6,546,391 B1* | 4/2003 | Tsuruoka | H04L 29/12009 |
| 6,694,323 B2* | 2/2004 | Bumbulis | G06F 16/2246 |
| 2002/0083033 A1 | 6/2002 | Abdo | |
| 2003/0061189 A1 | 3/2003 | Baskins | |
| 2003/0198291 A1* | 10/2003 | Gold | H04N 19/423 375/240.01 |
| 2005/0027679 A1 | 2/2005 | Sample | |
| 2013/0297641 A1* | 11/2013 | Shinjo | G06F 16/24 707/758 |
| 2017/0242855 A1 | 8/2017 | Futamura | |
| 2017/0255670 A1 | 9/2017 | Lei | |
| 2017/0364563 A1* | 12/2017 | Gao | G06F 16/2379 |

OTHER PUBLICATIONS

Kanal Hun: Analysis of depth of digital trees built on general sources, Computer Science [cs]. Université de Caen Basse-Normandie, 2014. (Year: 2014).*
"Exploring Java BitSet", Developer.com, Downloaded from the Internet Nov. 12, 2018, 7 pages, <https://www.developer.com/java/data/exploring-java-bitset.html>.

(Continued)

*Primary Examiner* — Kuen S Lu
(74) *Attorney, Agent, or Firm* — Andrew Aubert

(57) ABSTRACT

Technique for adding new key values (that is, new strings of binary digits that can be obtained by concatenating node values of nodes on a path through a tree) to a tree where each node corresponds to an ordered string of binary digits. When integrating the new key value, an XOR function is used to find an appropriate insertion location node (sometimes called a "selected parent node") by efficiently finding the node that represents a path value (that is, concatenated value) that includes the longest prefix and a dissimilar suffix. Once the parent node is selected, the child nodes of this selected parent node are added and/or re-arranged to accommodate the new key value.

18 Claims, 4 Drawing Sheets

(56) References Cited

OTHER PUBLICATIONS

"How are hash table's values stored physically in memory?", asked Feb. 26, 2015 at 23:51, 9 pages, <http://cs.stackexchange.com/questions/39862/how-are-hash-tables-values-stored-physically-inmemory>.
Morrison, Donald R., "PATRICIA—Practical Algorithm to Receive Information Coded in Alphanumeric", Journal of the Association for Computing Machinery, vol. 15, No. 4, Oct. 1968, pp. 514-534.

* cited by examiner

OPTIMIZING HASH STORAGE AND MEMORY DURING CACHING

BACKGROUND

The present invention relates generally to the field of tree data structures and more particularly to radix tree structures.

A radix tree (also known as a radix trie or a compact prefix tree) is a data structure that is an implementation of a prefix tree, or a type of data structure tree that stores common prefix values in each node until reaching a leaf (also known as an edge or terminal) node. As an example, a common prefix for the two words 'romance' and 'romantic' would be 'roman', which would form the root node, with 'ce' and 'tic' as two separate child nodes from 'roman'. In radix trees, it is sometimes desired to insert a new node into a pre-existing radix tree. The new node to be inserted is called a "key," and the insertion location is generally determine by the substantive content of the node to be inserted.

Patricia tries (also herein sometimes referred to as a "patricia tree") are a type of radix tries where: (i) each bit of the key is compared individually to other individual bits of other node(s) in the patricia tree to determine where the key will be inserted into the patricia tree as a new node; and (ii) each non-leaf node has 2 child nodes. A patricia tree is typically used to build up binary strings that are used to represent alphanumeric characters, kanji or the like. A patricia tree is typically constructed by comparing binary information correspond to alphanumeric characters.

A hash table (also known as a hash map) is a data structure in the form of an associative array abstract data type for mapping values to keys. Hash tables use hash functions to determine an index for finding desired values stored in the hash table, where hash functions are used to map arbitrary sized data to a data value with a fixed size. The data that a hash function returns is called a hash value (alternatively called hash codes, digests, or hashes).

A bitwise XOR operation, also known as an XOR comparison, is a comparison between two input bit patterns (or sequences of bits) of the same length and returns a third bit pattern of the same length. In this third bit pattern, each bit has a value of 0 if both bits were the same value (either both a 0 or both a 1) in the input bit patterns and a value of 1 if the bit has a different value in each input bit pattern. For example, an XOR comparison between the input bit patterns 0001 and 0011 would result in a bit pattern of 0010, because the first two bits on the left and the last bit on the right are identical in each input bit pattern, with only the second bit from the right being dissimilar to each other.

SUMMARY

According to an aspect of the present invention, there is a method, computer program product and/or system that performs the following operations (not necessarily in the following order): (i) receiving an original version of a binary-node-value (BNV) tree data structure, with the BNV tree data structure including a plurality of nodes, with each node having a node value in the form of a string of binary digit(s) and hierarchical paths among and between the plurality of nodes such that binary values are obtained by concatenating strings of binary digit(s) of nodes along hierarchical paths through at least a portion of the BNV tree data structure; (ii) receiving a new key in the form of a key value binary digit string to be integrated into the BNV tree data structure; (iii) selecting an insertion location node of the plurality of nodes in the BNV tree data structure, with the insertion location node representing a path value that: (a) shares the largest number of common prefix bits with the key value binary digit string, and (b) has dissimilar suffix(es) relative to the key value binary digit string; and (iv) determining a revised version of the BNV tree data structure, with the determination of the revised BNV data structure including: (a) revising the insertion location node of the BNV tree data structure to eliminate from its node value any binary digits included in the dissimilar suffix(es), and (b) creating a plurality of child nodes under the insertion location node in the revised BNV data structure so that the path values of the plurality of child nodes have path values representing all of the dissimilar suffix(es).

DETAILED DESCRIPTION

Figure 1:
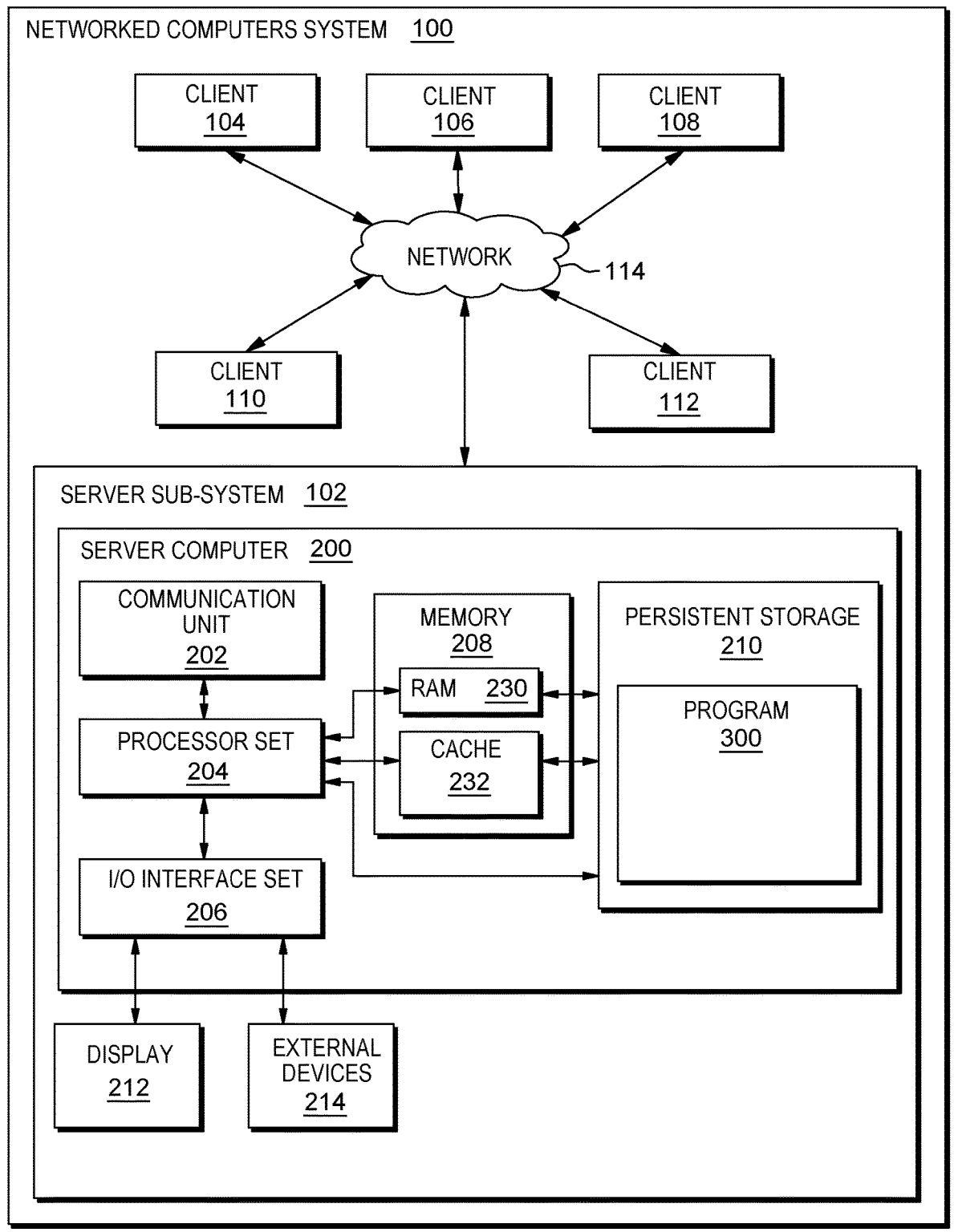
FIG. 1 is a block diagram view of a first embodiment of a system according to the present invention.

Some embodiments of the present invention are directed to adding new key values (that is, new strings of binary digits that can be obtained by concatenating node values of nodes on a path through a tree) to a tree where each node corresponds to an ordered string of binary digits. When integrating the new key value, an XOR function is used to find an appropriate insertion location node (sometimes called a "selected parent node") by efficiently finding the node that represents a path value (that is, concatenated value) that includes the longest prefix and a dissimilar suffix. Once the parent node is selected, the child nodes of this selected parent node are added and/or re-arranged to accommodate the new key value. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
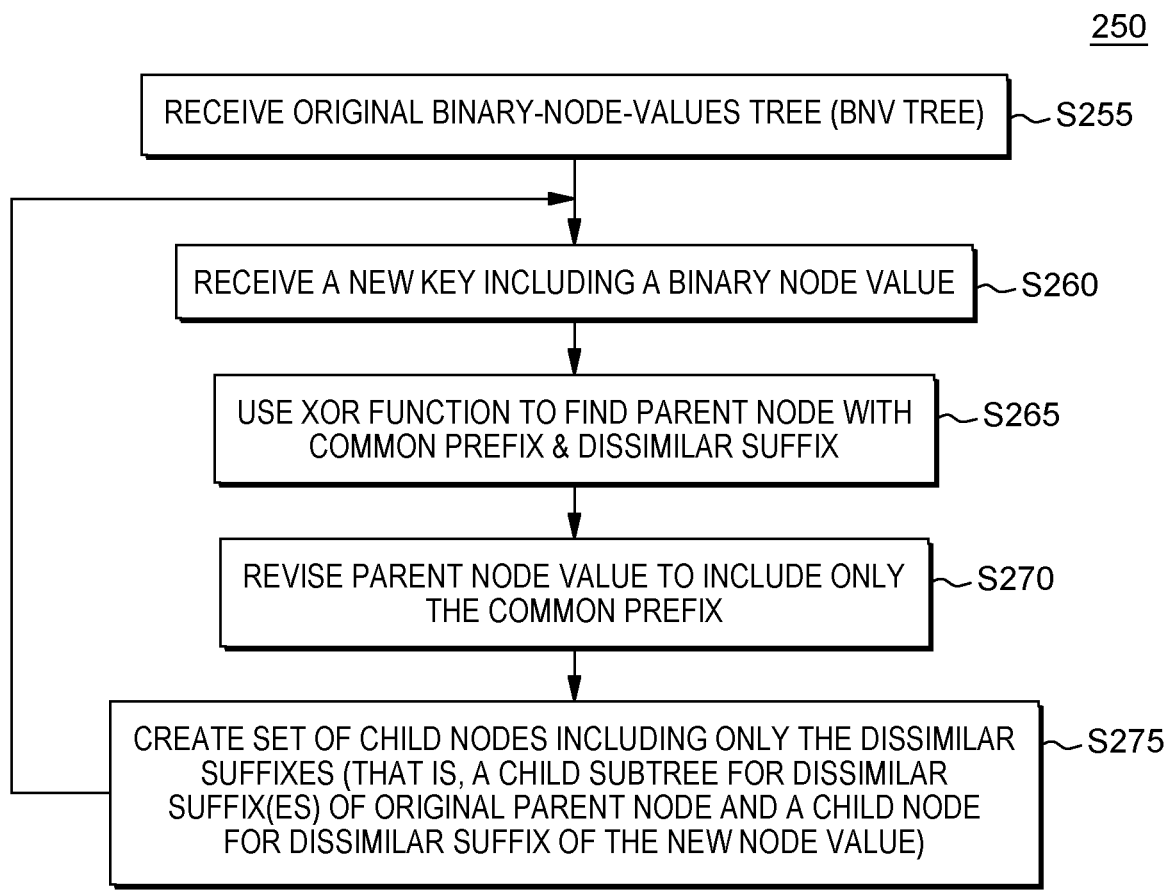
FIG. 2 is a flowchart showing a first embodiment method performed, at least in part, by the first embodiment system.
Figure 3:
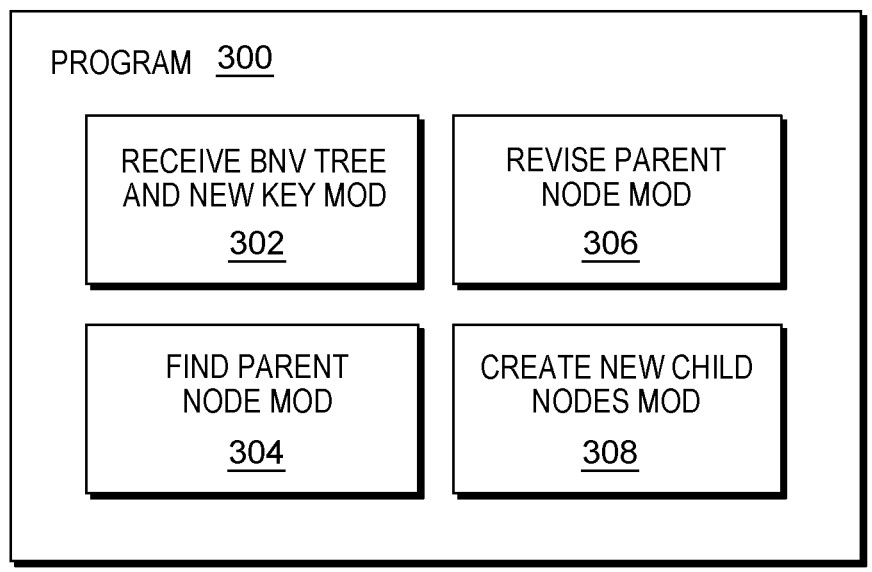
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where receive binary-node-values (BNV) tree mod 302 receives a BNV tree from client subsystem 104 through communication network 114. In this simple example, the originally received BNV tree consists only of a root node having a three digit binary value 000 (as shown at the left side of diagram 400a of FIG. 4A). As the term is used herein, a binary-node-value tree (not to be confused with a binary tree) is any tree structure where: (i) the node values are limited to strings of binary digit(s); and (ii) lower level nodes can be concatenated, as suffixes or prefixes, with higher level nodes to form larger strings of binary digits. A patricia tree (discussed, above, in the Background section) is one type of BNV tree.

Processing proceeds to operation S260, where receive binary-node-values (BNV) tree module ("mod") 302 receives a new key from client subsystem 106 through communication network 114. This new key is shown at the right side of diagram 400a of FIG. 4A. More generally speaking, a new key is a string of binary digits that is to be added to the tree in the sense that there will exist a path through the tree such that when the respective binary values nodes along the path are concatenated, then the new key value can be obtained through this concatenation. The concatenation convention of the BNV tree may be organized such that: (i) higher level nodes act as prefixes relative when concatenated with binary strings of lower level nodes; or (ii) higher level nodes act as suffixes relative when concatenated with binary strings of lower level nodes.

Figure 4A:
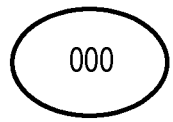
FIGS. 4A to 4C are diagrams illustrating operations of the first embodiment system.

Processing proceeds to operation S265, where find parent node mod 304 finds an appropriate parent node by traversing the BNV tree and using an XOR function (discussed, above, in the Background section) to compare the binary string of the new key with various node values of the BNV tree to find the node that represents the longest common prefix and the shortest dissimilar suffix. Integrating the new key of FIG. 4A into the BNV tree as it exists at FIG. 4A provides a trivial example. More specifically, the new key binary string can only be compared to the root node because that is the only node value that exists in the BNV tree. In this trivial example, the common prefix is "00," because it is common as the leftmost digits of the root node and the new key value. The dissimilar suffixes are: (i) "0" for the root node of FIG. 4A; and (ii) "1" for the new key value of FIG. 4A. Discussion will return to operation S265 with respect to the somewhat more involved example of FIGS. 4B and 4C, but first discussion of the changes that occur at operations S270 and S275 will be discussed with reference to this example of FIG. 4A.

Processing proceeds to operation S270, where revise parent node mod 306 revises the parent node, previously selected at operation S265, so that the parent node only represents the common prefix determined at operation S265. In the example of revising the tree with the new key of FIG. 4A to get to the revised BNV tree of FIG. 4B, this common prefix is "00," so the root node is revised from "000" to "00" so that it includes only the common prefix and excludes the dissimilar suffix (in this case the rightmost "0"). This revised root node is shown in the revised BNV tree at the left hand side of diagram 400b of FIG. 4B.

Processing proceeds to operation S275, where create new child nodes mod 308 creates new child nodes to accommodate the dissimilar suffixes. In the trivial example of revising the BNV tree from its original state, as shown in FIG. 4A, to its revised state, shown in FIG. 4B: (i) the dissimilar suffix of the original root node (that is, "0") is added to the BNV tree as a child node of the root node; and (ii) the dissimilar suffix of the new key of FIG. 4A (that is, "1") is added to the BNV tree as another child node of the root node. This means that the revised BNV tree, after inserting the new key binary string of FIG. 4A, is the BNV tree shown at the left hand side of FIG. 4B. This BNV tree can be used to: (i) build the 3 binary digit length string "000" by first taking the binary digit string of the root node as prefix and concatenating the left hand side child of the root node, which has a one binary digit length string of "0"; and (ii) build the 3 binary digit length string "001" by first taking the binary digit string of the root node as a prefix and concatenating the right hand side child of the root node, which has a one binary digit length string of "1".

Figure 4B:
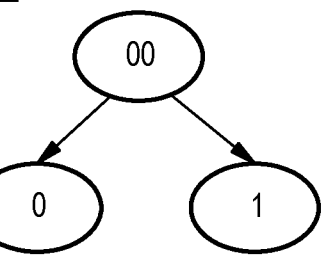

Now that the trivial example of moving from the BNV tree of FIG. 4A to the BNV tree of FIG. 4B has been discussed, processing will loop back around to operation S260 where a new key value of "010" is received and needs to be integrated into the BNV tree of FIG. 4B.

Processing proceeds, again, to operation S265 where the XOR function is used to find the parent node with the longest common prefix and the shortest dissimilar suffix. In this example, the search for the longest common prefix does not make it past the root node of the BNV tree of FIG. 4B. Specifically, the common prefix is only one (1) binary digit long, and is "0" in its bit value. There is no need here to traverse the BNV tree down to lower level values to find the longest common prefix, but, this possibility will be further shown and/or discussed in the following sub-section of this Detailed Description section.

Processing proceeds, again, to operation S270, where the new parent node (in this case the root node) is adjusted so that it has a binary digit string that includes only the common prefix (or at least the rightmost digits of the common prefix in cases where there are higher level nodes above the selected parent node). This revised parent node is shown as the root node in the re-revised BNV tree at the left hand side of diagram 400c of FIG. 4C.

Figure 4C:
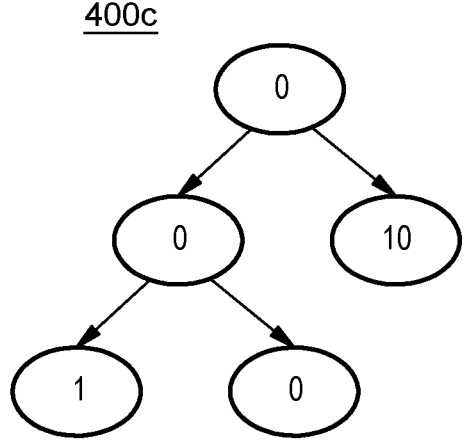

Processing proceeds, again, to operation S275, where create new child mode 308 creates a set of child nodes to accommodate the dissimilar suffixes as between the new key value being integrated and the dissimilar suffix of the parent node that is being "knocked down a level" in the re-revised BNV tree. More specifically: (i) the set of dissimilar suffixes of the selected parent node (specifically "01" and "00") are converted into a subtree of three child nodes as shown in FIG. 4C; and (ii) the dissimilar suffix of the new key value (specifically "10") is converted into another child node at a level directly below the root node as shown in FIG. 4C.

III. Further Comments and/or Embodiments

Some embodiments of the present invention recognize the following facts, potential problems and/or potential areas for improvement with respect to the current state of the art: (i) from an application context, whenever a cache to store the application level key/value (keys) (for example, from a properties file) is implemented, a hashtable or hashmap is the most commonly implemented data structure; (ii) a reason for this is the fast retrieval of the keys at O(1) time complexity for hashtable or hashmap; and/or (iii) a hashmap/hashtable has a relatively significant memory overhead compared to other data structures.

Some embodiments of the present invention may include one, or more, of the following features, characteristics and/or advantages: (i) in scenarios where it can be discerned that the keys have some common prefix or keys can be clubbed into groups having common prefixes, it is possible to implement the same using Patricia Trie instead of a hashmap/hashtable which has huge memory overhead; (ii) create a patricia trie using BitSet for fast storage and retrieval of key value pairs that will be space optimized; (iii) keys will be converted to binary representation of the same and stored using BitSet; (iv) a method that will optimize a patricia trie; (v) instead of storing the keys directly into patricia trie, the keys will be converted to binary representation of the same and stored using BitSet; (vi) alternatively to BitSet, any class that provides Binary operations may be used; (vii) using BitSet for storing the keys helps in fast prefix matching, by doing various bit operations of keys; (viii) this provides the required processing speed for searching and insertion while optimizing a patricia trie for space complexity; (ix) a novel "compression technique"; (x) overcome a situation where common prefixes are skipped (and not represented) by using the prefix node to store values for the key; (xi) for example, "rom" and "Romulus" can be two different keys and "rom" can act as the prefix node to "romulus" and still store the value for "rom"; (xii) storing the keys in binary; (xiii) while inserting a new key, perform the XOR operation with the root/parent node to find the first dissimilar bit, store the prefix as parent node and the dissimilar suffixes as its child nodes; (xiv) in this proposal, don't use any other data structure, rather perform bit operation XOR to find a common prefix and store the corresponding suffixes as child nodes; (xv) this proposal optimizes space by storing keys in binary and separating out common prefixes; and/or (xvi) storing application level keys/values (for example, from a properties file) in cache memory using a patricia trie modified according to aspects of the present invention.

Some embodiments of the present invention may include one, or more, of the following features, characteristics and/or advantages: (i) do not store the elements/keys in the patricia trie as literals, instead store the keys in binary; (ii) perform the XOR operation to find the first dissimilar bit, store the prefix as parent node and the dissimilar suffixes as its child nodes; (iii) avoiding any redundancies; (iv) storing keys in BitSet makes the trie more space optimized and also helps in faster prefix matching in case of operations like search/insert; (v) divergent from efficient termination of variable length keys using null elements, instead of implementing efficient storage of keys using bites in a Patricia trie; (vi) a complete different implementation of Patricia trie optimizing the space; (vii) while inserting a new key we perform the XOR operation with the root/parent node to find the first dissimilar bit, store the prefix as parent node and the dissimilar suffixes as its child nodes; (viii) don't use any other data structure, rather perform bit operation XOR to find a common prefix and store the corresponding suffixes as child nodes; (ix) this proposed technique optimizes space by storing keys in binary and separating out common prefixes; (x) describe a method to optimize patricia trie for space complexity; (xi) keys will be converted to binary representation of the same and stored using BitSet; (xii) memory taken by Patricia Trie with this proposed technique requires approximately 20% less memory than a HashMap; (xiii) for example, a set of 10 keys in a traditional HashMap requires 9646 bytes; and/or (xiv) the same set of 10 keys stored in an implementation of the proposed technique requires only 7605 bytes.

Some embodiments of the present invention may include one, or more, of the following features, characteristics and/or advantages: (i) perform the XOR operation to find the first dissimilar bit, store the prefix as parent node and the dissimilar suffixes as its child nodes, avoiding any redundant key values; (ii) storing keys in BitSet makes the trie more space optimized and also helps in faster prefix matching in the case of operations such as search and insert; (iii) a method for efficient storage of keys using bits or binary patterns in a Patricia trie; and/or (iv) forego the usage of any data structure other than converting key values to binary patterns and perform bit operation XOR to find a common prefix, and store the corresponding suffixes as child nodes.

Figure 5A:
FIGS. 5A to 5C are diagrams illustrating operations of an alternative embodiment system.
Figure 5B:
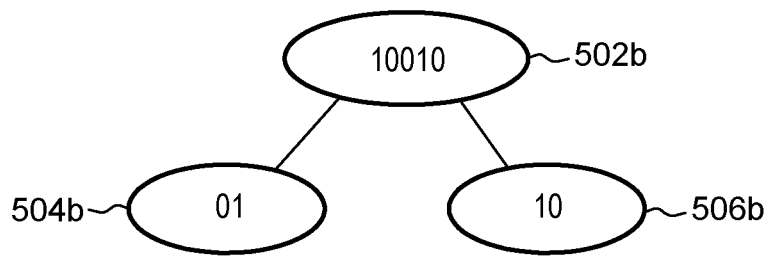

One embodiment of the present invention will be discussed with reference to FIGS. 5A-5C. This embodiment will be described by inserting nodes into a modified patricia trie with the help of 3 keys taken as an example. These keys are converted into their corresponding binary representation before they can be inserted into the trie. Prior to FIG. 5A, a first key has already been converted to a binary representation, with a value of 1001010 and a length of 7 bits. As this is the first key to be entered into the trie, there is no other keys to compare it to, and it is entered as the key of the root node with no XOR comparison. The resulting root node has a key of 1001010, shown as 502A of diagram 500A of FIG. 5A.

When the second key (with a value of 1001001 and a length of 7 bits) is inserted, it will be compared against the key of the current node in the trie, which is presently the key of the root node. If the key to be inserted has a similar key pattern with the current key, it will be compared until the length of the current key (as in the example length of 7 bits) has been reached. The next step is to traverse/create (in this case, since the current node is a root) to the child node of the current node based on the next bit of the key to be inserted. If the next bit is 1, traverse to the right child node of the current node. If the next bit is 0, traverse to the left child node of the current node. This step is iterated until a key comprising an assemblage of keys from each node traversed thus far has an equal length as the key that is to be inserted. An XOR comparison between the second key (1001001, length of 7 bits) to be inserted and the current key (1001010, length of 7 bits), is taken to find the first dissimilar bit. In this example embodiment, the first dissimilar bit is the second bit from the right, which has a value of 0 in the current key and a value of 1 in the second key.

The remaining bits to the left of the first dissimilar bit form the common prefix between the compared keys, which in this example the common prefix is 10010, with a length of 5 bits. The current node is reduced in length to the length of the common prefix (5 bits), so that the current node now has a key equal to the common prefix. The bits remaining that are not part of the common prefix (from both the second key and what was the key of the current node before this insertion) are made into the keys for the two child nodes of the current node, shown in diagram 500B of FIG. 5B. Diagram 500B includes a root node 502B with a key of 10010 (equal to the common prefix described above) and two child nodes, 504B with a key of 01 and 506B with a key of 10. Child node 504B is traversed to when the next bit of a key to be compared has a value of 0 and child node 506B is traversed to when the next bit of a key to be compared has a value of 1.

Next, when a third key (with a value of 1000101, length of 7 bits) is inserted, an XOR comparison between the third key and the root node must occur. In this instance, the key of the root node now has a length of 5 bits. To perform this XOR comparison, a subset of the third key is taken, with the length of this subset equaling the length of the key of the root node, taken from the left of the third key. In this example, the subset is 10001. An XOR comparison between this subset and the key of the root node returns a bit pattern of 00011, indicating that the fourth bit from the left of the third key is the first dissimilar bit. The common prefix between this third key and the key of the root node is 100, with a length of 3 bits. The bits that form the common prefix (100) are removed from the key of the root node, leaving behind a key of 10. This root node is now made into a child of a new root node, with the new root node having the removed common prefix bits (100) as its key. This new root node also has another child, with a key value consisting of the remaining bits of the third key (0101) after removing the bits that are part of the common prefix (100).

Figure 5C:
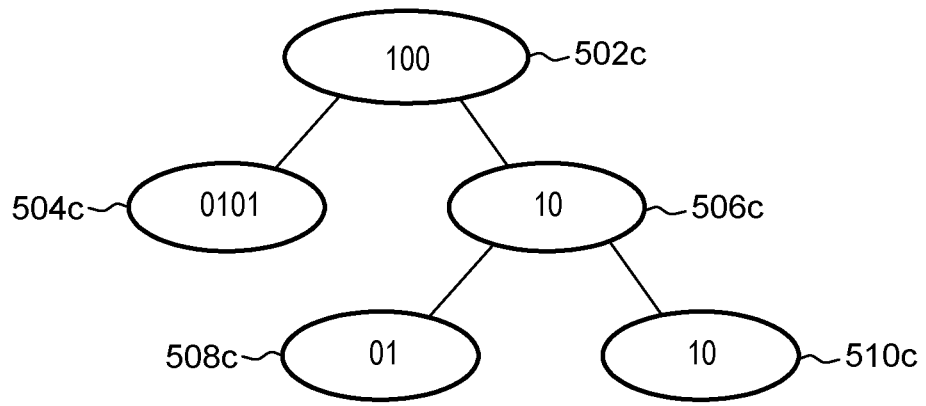

The trie after the third key is inserted is shown in diagram 500C of FIG. 5C. The new root node, 502C has a key of 100. 504C of FIG. 5C shows a first child node of root node 502C, with the first child node 504C having a key of 0101, the same as the third key without the common prefix identified earlier in this paragraph. 506C shows a second child node of the root node 502C, with the second child node having a key of 10, the same as the key of the root node 502B of FIG. 5B without the common prefix identified earlier in this paragraph. 508C and 510C are the same child nodes as 504B and 506B from FIG. 5B, now children of 506C which is, itself a child of 502C. As an example, a traverse/create of the trie in diagram 500C of FIG. 5C down to 510C would follow from 502C to 506C to 510C and result in a key of 1001010, the same as the original key of 502A from diagram 500A of FIG. 5A.

Worded alternatively, a new key with a value of 1000101 was inserted into a trie with a root node having a key of 10010, triggering an XOR comparison that identified 100 as the common prefix between a subset of the new key (10001) and the root node key (10010). The common prefix was inserted as the key of a new root node that has two child nodes. The first child node has no child nodes of its own and a key of 0101. The second child node has a key of 10, and two child nodes of its own, a first with a key of 01 and a second with a key of 10.

An example pseudocode implementation of a patricia trie according to one embodiment of the present invention will now be discussed. Prerequisites for this implementation include: (i) keys are converted to binary representations of their values before inserting into the patricia trie; (ii) traversing the patricia trie follows a rule that dictates if the next bit of the key being inserted is a 0, traverse to the left child of the current node; and (iii) if the next bit of the key being inserted is a 1, traverse to the right child of the current node. For example, a node in this modified patricia trie can look like the following:

```
Patricia_node
{
    int len; // len stores the length of the key
    String data; //stores the data corresponding to the key
    BitSet key; //stores the key in the form of binary representation
    Patricia_node left_child; // left child pointer
    Patricia_node right_child; // right child pointer
}
```

This pseudocode implementation of a node for a patricia trie modified according to one embodiment of the present invention includes five variables for storing necessary properties of a given node within the modified patricia trie.

An example pseudocode implementation of an insert routine, which is responsible for inserting new keys into the modified patricia trie, according to one embodiment of the present invention may resemble the following:

```
insert(head , key ,value){
    if(head==null){
        head=createNode( );
        return;
    }
    isKeyPresent=find(key)
    if(isKeyPresent)
        print "Key already present"
    currentBitinKey=0
    while(head!=null){
        firstMismatchBit=key[currentBitinKey,head.len-1] XOR head.key[0,head.len-1]
        if(firstMismatchBit<head.len){
            newNode=createNode(head.key , 0 , firstMismatchBit-1)
            if(parent!=null && parent.left==head)
                parent.left=newNode
            else
                parent.right=newNode
            if(head.key[t]==0){
                newNode.left=updateNode(head.key,firstMismatchBit,head.len-1)
                newNode.right=createNode(key,firstMismatchBit,head.len-1)
            }
            else{
                newNode.left=createNode(key,firstMismatchBit,head.len-1)
                newNode.right=updateNode(head.key,firstMismatchBit,head.len-1)
            }
            break;
        }
        parent=head
        if(key[currentBitinKey+head.len+1]==1)
            head=head.right
        else
            head=head.left
    }
}
```

An example pseudocode implementation of a find routine, which is responsible for traversing the modified patricia trie to identify whether a given value is present, and where it is if it is present, according to one embodiment of the present invention may resemble the following:

```
find(head ,key){
    currentBitinKey=0
    while(key.len){
        firstMismatchBit=key[currentBitinKey,head.len] XOR head.key[counter,head.len]
        if(firstMismatchBit!=0){
            notFound=true
            break
        }
        currentBitinKey+=head.len
        if(key[currentBitinKey+head.len+1]==1)
            head=head.right
        else
            head=head.left
    }
    if(!notFound)
        return true
    return false
}
```

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer implemented method ("CIM") comprising:
receiving an original version of a binary-node-value (BNV) tree data structure, with the BNV tree data structure including a plurality of nodes, with each node having a node value in the form of a string of binary digit(s) and hierarchical paths among and between the plurality of nodes such that each given leaf node in the BNV tree corresponds to a string of binary digits comprising the node value of the given leaf node concatenated with the node value of every intervening parent node between the leaf node and a root node;
receiving a new key corresponding to one literal property value of an application properties file containing a plurality of literal property values;
responsive to receiving the new key, converting the new key from the literal property value to a binary representation including a key value binary digit string corresponding to the literal property value;
selecting an insertion location node of the plurality of nodes in the BNV tree data structure, with the insertion location node representing a path value that: (i) shares the largest number of common prefix bits with the key value binary digit string, and (ii) has dissimilar suffix(es) relative to the key value binary digit string; and
determining a revised version of the BNV tree data structure, with the determination of the revised BNV data structure including:
revising the insertion location node of the BNV tree data structure to eliminate from its node value any binary digits included in the dissimilar suffix(es), and
creating a plurality of child nodes under the insertion location node in the revised BNV data structure so that the path values of the plurality of child nodes have path values representing all of the dissimilar suffix(es).

2. The method of claim 1 wherein the BNV tree data structure is a patricia tree.

3. The method of claim 1 further comprising:
storing the key value binary digit string using Bit Set.

4. The method of claim 1 further comprising:
the BNV tree data structure is stored in a cache memory.

5. The method of claim 1 wherein:
the selection of the insertion location node includes traversing at least some nodes of the original version of the BNV tree data structure using the XOR function to compare the key value binary digit string to the node value of each node visited during the traversal.

6. The method of claim 1, wherein each node of the BNV tree further includes a length property corresponding to how many digits comprise the string of binary digit(s) of the node value of the node.

7. A computer program product (CPP) comprising:
a machine readable storage device; and
computer code stored on the machine readable storage device, with the computer code including instructions for causing a processor(s) set to perform operations including the following:
receiving an original version of a binary-node-value (BNV) tree data structure, with the BNV tree data structure including a plurality of nodes, with each node having a node value in the form of a string of binary digit(s) and hierarchical paths among and between the plurality of nodes such that each given leaf node in the BNV tree corresponds to a string of binary digits comprising the node value of the given leaf node concatenated with the node value of every intervening parent node between the leaf node and a root node,
receiving a new key corresponding to one literal property value of an application properties file containing a plurality of literal property values;

responsive to receiving the new key, converting the new key from the literal property value to a binary representation including a key value binary digit string corresponding to the literal property value, selecting an insertion location node of the plurality of nodes in the BNV tree data structure, with the insertion location node representing a path value that: (i) shares the largest number of common prefix bits with the key value binary digit string, and (ii) has dissimilar suffix(es) relative to the key value binary digit string, and determining a revised version of the BNV tree data structure, with the determination of the revised BNV data structure including:
  revising the insertion location node of the BNV tree data structure to eliminate from its node value any binary digits included in the dissimilar suffix(es), and
  creating a plurality of child nodes under the insertion location node in the revised BNV data structure so that the path values of the plurality of child nodes have path values representing all of the dissimilar suffix(es).

8. The CPP of claim 7 wherein the BNV tree data structure is a patricia tree.

9. The CPP of claim 7, wherein the computer code further includes instructions for causing the processor(s) set to perform the following operations:
  storing the key value binary digit string using Bit Set.

10. The CPP of claim 7, wherein the computer code further includes instructions for causing the processor(s) set to perform the following operations:
  the BNV tree data structure is stored in a cache memory.

11. The CPP of claim 7 wherein:
  the selection of the insertion location node includes traversing at least some nodes of the original version of the BNV tree data structure using the XOR function to compare the key value binary digit string to the node value of each node visited during the traversal.

12. The CPP of claim 7, wherein each node of the BNV tree further includes a length property corresponding to how many digits comprise the string of binary digit(s) of the node value of the node.

13. A computer system (CS) comprising:
  a processor(s) set;
  a machine readable storage device; and
  computer code stored on the machine readable storage device, with the computer code including instructions for causing the processor(s) set to perform operations including the following:
    receiving an original version of a binary-node-value (BNV) tree data structure, with the BNV tree data structure including a plurality of nodes, with each node having a node value in the form of a string of binary digit(s) and hierarchical paths among and between the plurality of nodes such that each given leaf node in the BNV tree corresponds to a string of binary digits comprising the node value of the given leaf node concatenated with the node value of every intervening parent node between the leaf node and a root node,
    receiving a new key corresponding to one literal property value of an application properties file containing a plurality of literal property values;
    responsive to receiving the new key, converting the new key from the literal property value to a binary representation including a key value binary digit string corresponding to the literal property value,
    selecting an insertion location node of the plurality of nodes in the BNV tree data structure, with the insertion location node representing a path value that: (i) shares the largest number of common prefix bits with the key value binary digit string, and (ii) has dissimilar suffix(es) relative to the key value binary digit string, and
    determining a revised version of the BNV tree data structure, with the determination of the revised BNV data structure including:
      revising the insertion location node of the BNV tree data structure to eliminate from its node value any binary digits included in the dissimilar suffix(es), and
      creating a plurality of child nodes under the insertion location node in the revised BNV data structure so that the path values of the plurality of child nodes have path values representing all of the dissimilar suffix(es).

14. The CS of claim 13 wherein the BNV tree data structure is a patricia tree.

15. The CS of claim 13, wherein the computer code further includes instructions for causing the processor(s) set to perform the following operations:
  storing the key value binary digit string using Bit Set.

16. The CS of claim 13, wherein the computer code further includes instructions for causing the processor(s) set to perform the following operations:
  the BNV tree data structure is stored in a cache memory.

17. The CS of claim 13 wherein:
  the selection of the insertion location node includes traversing at least some nodes of the original version of the BNV tree data structure using the XOR function to compare the key value binary digit string to the node value of each node visited during the traversal.

18. The CS of claim 13, wherein each node of the BNV tree further includes a length property corresponding to how many digits comprise the string of binary digit(s) of the node value of the node.

* * * * *